Patented Mar. 23, 1948

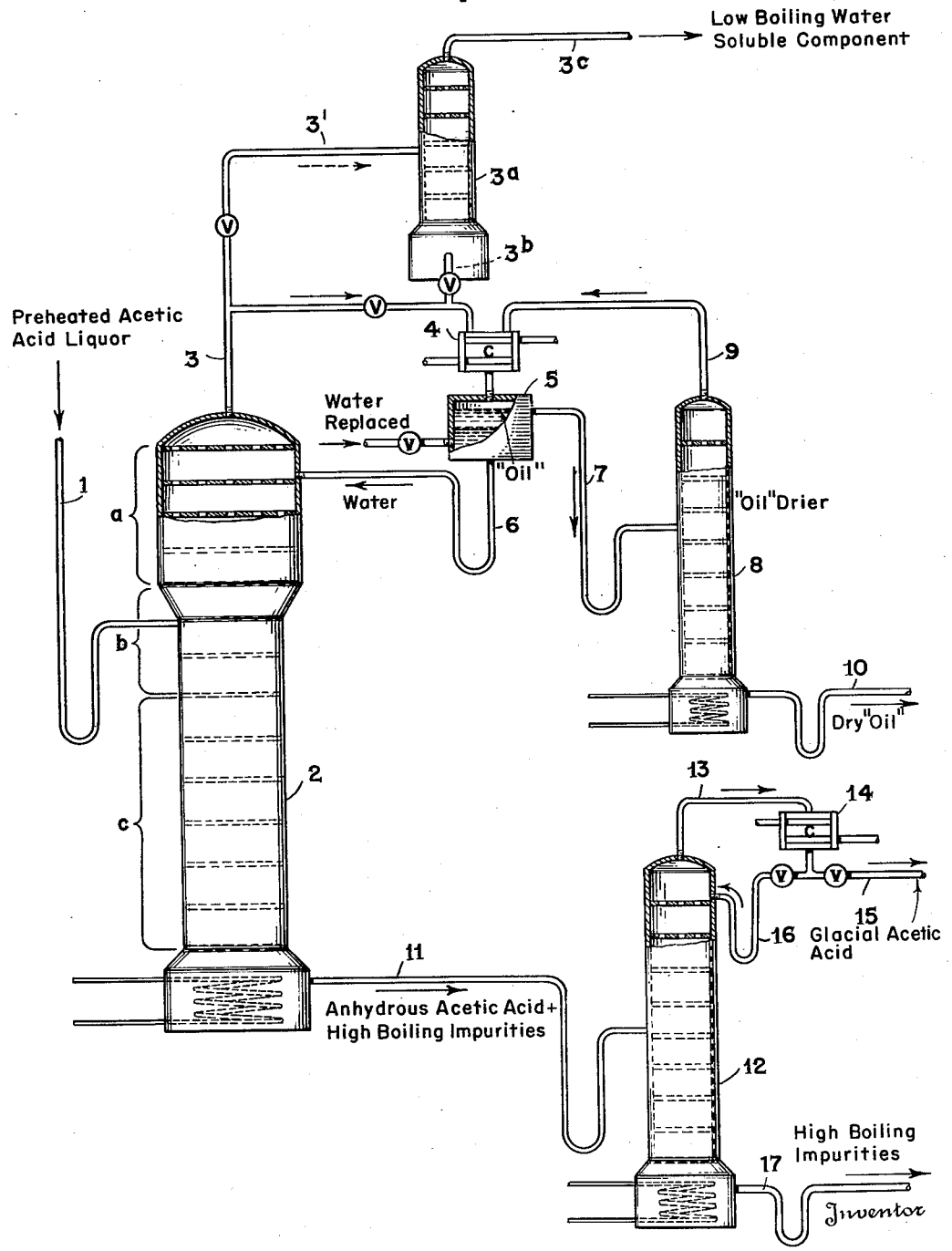

2,438,300

UNITED STATES PATENT OFFICE 2,438,300

PROCESS FOR THE PURIFICATION OF ACETIC ACID BY AZEOTROPIC DISTILLATION

Lester E. Schniepp, Peoria, Ill., assignor to the United States of America as represented by the Secretary of Agriculture Application April 7, 1944, Serial No. 530,071

3 Claims. (Cl. 202—42)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purpose without the payment to me of any royalty thereon.

This invention relates to a process for separating acetic acid from liquids which boil at temperatures relatively close to the boiling point of acetic acid. More specifically it relates to a method of separating acetic acid from liquid condensate mixtures of acetic acid, esters, ketones, and hydrocarbons obtained from the pyrolysis of 2,3-butylene glycol diacetate.

Methods of concentrating and purifying acetic acid where the contaminating materials are water, or non-aqueous impurities boiling at temperatures sufficiently divergent from the boiling point of acetic acid to make fractional distillation practical are well known to the art. However, when acetic acid mixtures containing impurities boiling within plus or minus 15° C. of the acetic acid are encountered, as in the case of the liquid condensate mixtures obtained from the pyrolysis of 2,3-butylene glycol diacetate, separation by fractional distillation is an inefficient and costly operation.

It is desirable in such case to recover the acetic acid in a pure state as well as to isolate the esters, or other components of the mixture, relatively free of acetic acid.

It is possible to accomplish the separation by extraction methods, utilizing combinations of water and hydrocarbon solvents, or by repeated fractionations in highly efficient fractionating columns. These methods are, however, both costly and time-consuming.

It has now been found that such separation can be simply and efficiently accomplished by utilizing the principles of azeotropism. Acetates, ketones, and hydrocarbons which boil at temperatures close to the boiling point of acetic acid practically all form water-azeotropes which boil 20° to 35° C. below the acetic acid boiling point. This temperature differential permits efficient fractionation of such azeotropes from acetic acid. In addition most such acetates, ketones, or hydrocarbons are relatively insoluble in water so that when their water-azeotropes are condensed, separation occurs. By simple decantation the water can be recycled to the operation and the organic materials removed in a relatively water-free state. Complete drying of these materials can then be accomplished by heating to the boiling points of the azeotropes so that a portion of the organic material itself serves to remove any dissolved water, producing a dry product as the bottoms product from a continuous distillation column.

An additional advantage of this process over the usual water extraction methods is realized by the fact that the amount of water required to effect the desired separation is quite small. In no case does the water content of the acetic acid after removal of the azeotropes exceed 20 percent, and in continuous operation the dilution is usually less than 10 percent. Therefore, the removal of any excess of water from the acetic acid can be readily accomplished by simple fractionation.

Continuous operation of the process may be accomplished in equipment similar in design to that employed in the concentration of dilute acetic acid by an entrainer-azeotrope system. The following detailed description of the continuous process is illustrated in the accompanying drawing.

The acetic acid liquors, consisting of an acetic acid solution of an ester, ketone, and hydrocarbon, is preheated in a conventional heat exchanger and introduced into the azeotropic stripping column 2 via line 1. Upon entering the column these liquors are contacted with water in zone $b$. Distillation is effected and the ester-water, ketone-water, and hydrocarbon-water, ascend the column of which section $a$ serves to fractionally separate the azeotropes from dilute acetic acid. The vapors escaping from the top of the column via line 3 are condensed in the condenser 4. The condensed liquid flows to the decanter 5 wherein separation of the organic material, hereafter referred to as the "oil," and the water occurs. The lower, or water layer, returns to the column 2 via the reflux line 6 and is continuously reutilized for azeotropic removal of the impurities from the acetic acid feed liquors. Section $c$ of the column 2 serves to fractionate excess water, over and above that required to form the azeotropes with the materials in the feed liquors, from the acetic acid. Anhydrous acetic acid containing only high boiling impurities is produced at the base of the column 2.

The wet "oil" layer from the decanter 5 continuously flows via line 7 to the "oil" drying column 8, wherein sufficient heat is supplied to vaporize the "oil"-water azeotrope. The vapors escaping from the head of this column via line 9 are condensed in the condenser 4 and returned to the decanter 5 along with the main distillate from column 2. The "oil"-drying column 8 thus effects a separation of the "oil"-water azeotrope from the bulk of the "oil" and a water-free "oil" is continuously removed via line 10.

The anhydrous acetic acid solution of high boiling impurities is continuously removed from the base of the azeotropic stripping column 2 via line 11 and introduced into the acetic acid rectification column 12. Distillation of the acetic acid is effected and the vapors escaping from the top of this column via line 13, are condensed in the condenser 14, and glacial acetic acid is continuously removed via line 15. In some cases the acetic acid fed to this column 12 still contains distillable impurities and it is advisable to maintain a partial reflux of distillate to effect better rectification. This may be accomplished by returning part of the condensate from condenser 14 to the column via reflux line 16.

The high boiling residues from the acetic acid rectification are continuously removed from the base of column 12 via line 17.

In cases where the original acetic acid liquors fed to column 2 contain low boiling, water-soluble impurities which interfere with efficient separation of the condensed azeotropic distillate in the decanter, it is advisable to install a supplementary fractionating column 3a to remove such low boiling materials from the azeotropic distillate prior to cooling and decantation. When this is necessary the vapors from the azeotropic stripping column 2 pass via line 3' to the column 3a wherein the low boiling material, or its azeotrope, is fractionated from the bulk of the azeotropic distillate and removed via line 3c. The "oil"-water azeotropes, freed of this material, then are removed from this column via line 3b and flow to the condenser 4. The rest of the operation then proceeds as described above except that any water removed in the distillate from the column 3a must be replaced by the addition of an equivalent amount of water to the decanter 5 to keep the azeotropic system in balance.

In operating the process on complex mixtures of acetic acid, esters, ketones, and hydrocarbons, it is not always possible to effect perfect separation of the azeotropically distillable materials from acetic acid. Because the azeotropic stripping column must be operated at a vapor head temperature corresponding to the boiling point of the highest boiling azeotrope, to accomplish the removal of all but the high boiling components from the acetic acid liquors, some entrainment of acetic acid frequently occurs. Such situations are encountered in the separation and recovery of components from the liquid condensate mixtures obtained on pyrolysis of acetates. This is particularly true in the case of the acetic acid liquors obtained from the pyrolysis of 2,3-butylene glycol diacetate where unsaturated acetates, by-product ketones, and hydrocarbons are formed as partial or side reaction products. It is desirable to recover both the acetic acid in uncontaminated form and to isolate the intermediate unsaturated acetates for recycling to the pyrolysis process. Because of the complexity of these mixtures, the acetates recovered from such pyrolysis liquors may contain 10–12 percent of acetic acid. This presents no disadvantage, however, since the presence of small amounts of acetic acid has no deleterious effect on the behavior of these acetates on repyrolysis. In such instances where complete separation from acetic acid is desirable, subsequent purification operations are necessary.

The following example is illustrative of the invention.

Example

A continuous distillation column of the type shown as the column 2 of the accompanying drawing is charged with sufficient water to fill the plates above and including the feed-plate to the height of the plate overflow pipes. A decanter, similar in operation to that shown as 5 in the drawing, is attached to collect the condensate from a condenser, such as 4 in the drawing. This decanter is also filled with water. The column below the feed plate is charged with pure acetic acid and sufficient heat applied to raise the column contents to their boiling point.

A mixture of 86 parts of acetic acid (B. P. 118° C.), 5.0 parts of methyl vinyl carbinol acetate (B. P. 113° C.), 4.0 parts of an acetate of B. P. 120° C., 0.5 part of crotyl acetate (B. P. 129° C.), 0.75 part of methyl ethyl ketone (B. P. 80° C.), 1.0 part of unidentified hydrocarbons (B. P. 90°–130° C.) and 2.75 parts of high boiling impurities (B. P. above 150° C.) obtained as liquid condensate from the pyrolysis of 2,3-butylene glycol diacetate, is pumped through a heat exchanger to raise its temperature to 100° C. and continuously introduced into the feed plate of the column containing boiling acetic acid and water. By proper regulation of the feed rate, feed temperature, and heat input, the base temperature of the column is maintained at 118° C. and the temperature in the vapor line from the top of the column at 85° to 95° C. The vapors from the top of this column are introduced into a small continuous column (3a of diagram) where the temperature gradient is regulated to remove as distillate all materials and azeotropes boiling below 80° C. The base product from this column is continuously run to the condenser (4 on diagram) wherein complete cooling occurs and the cold, condensed azeotropic mixture is run to the decanter. This material stratifies into two layers in the decanter, the lower or water layer flowing continuously back into the main column (2) via the reflux line 6. Fresh water corresponding in amount to that removed in the distillate from the small auxiliary column (3a) is continuously fed into the decanter so that the total water in the distillation column will be maintained in an amount corresponding to 15 to 30 percent of the liquid condensate mixture in the column. The top or mixed acetate-hydrocarbon layer from the decanter is continuously run to a dehydrating column (8 of diagram) wherein the wet mixture is heated to such a temperature that dissolved water is continuously removed as an acetate-water azeotrope and returned via the head vapor line (9 of diagram) to the condenser and decanter system. The base product from this column consists of a dry mixture of methyl vinyl carbinol acetate, the acetate of B. P. 120° C., crotyl acetate, and hydrocarbons plus about 5 percent of acetic acid entrained in the highly complex distillate from the main column (2 of diagram). This material is suitable for the production of butadiene by pyrolysis.

The base product from the main column (2) comprises a mixture of acetic acid and the high boiling impurities of the original feed stock. This mixture is run continuously to a distillation column (12 of diagram) wherein sufficient heat is applied to effect distillation of the acetic acid which is removed via the vapor line (13 of diagram), condensed, and run to storage. This acetic acid is of high quality, 98-100 percent pure. The base product from this acetic acid rectification column (12) consists of a mixture of the materials in the original feed stock which boil at temperatures above 150° C.

Having thus described the invention, what is claimed is:

1. In a continuous process for separating acetic acid from the liquid condensate mixture obtained from the pyrolysis of 2,3-butylene glycol diacetate, continuously adding water to the liquid condensate mixture in an amount corresponding to 15 to 30 percent of the mixture, continuously distilling off the water-azeotropes of the esters, ketones, and hydrocarbons present in said liquid condensate mixture, continuously separating the condensed and stratified water-azeotropes, into water and organic liquid components, continuously returning the water for reutilization in adding to more liquid condensate mixture, and continuously dehydrating the esters, ketones, and hydrocarbons by continuously distilling from them the azeotropes formed with the water remaining dissolved, or mechanically suspended, in them on stratification in a continuous separator.

2. In a continuous process for separating acetic acid from the liquid condensate mixture, obtained from the pyrolysis of 2,3-butylene glycol diacetate, continuously adding water to the liquid condensate mixture in an amount corresponding to 15 to 30 percent of the mixture, continuously distilling off the water-azeotropes of methyl vinyl carbinol acetate, an acetate of B. P. 120° C., crotyl acetate, methyl ethyl ketone, and unidentified hydrocarbons of B. R. 90°-130° C. present in said liquid condensate mixture, continuously separating the condensed and stratified water-azeotropes, into water and organic liquid components, continuously returning the water for reutilization in adding to more liquid condensate mixture, and continuously dehydrating the methyl vinyl carbinol acetate, the acetate of B. P. 120° C., crotyl acetate, methyl ethyl ketone, and unidentified hydrocarbons of B. R. 90°-130° C. by continuously distilling from them the azeotropes formed with the water remaining dissolved or mechanically suspended in them on stratification in the continuous separator.

3. In a continuous process for separating acetic acid from the liquid condensate mixture, obtained from the pyrolysis of 2,3-butylene glycol diacetate, continuously adding water to the liquid condensate mixture in an amount corresponding to 15 to 30 percent of the mixture, continuously distilling off the water azeotropes of methyl vinyl carbinol acetate, an acetate of B. P. 120° C., crotyl acetate, methyl ethyl ketone, and unidentified hydrocarbons of B. R. 90°-130° C., present in said liquid condensate mixture, continuously fractionating the azeotropic distillate to separate the methyl ethyl ketone as its water-azeotrope from the other azeotropes, continuously separating the condensed and stratified water-azeotropes of methyl vinyl carbinol acetate, the acetate of B. P. 120° C., crotyl acetate, and the unidentified hydrocarbons of B. R. 90°-130° C. into water and organic liquid components, continuously returning the water for reutilization in adding to more liquid condensate mixture, and continuously dehydrating the methyl vinyl carbinol acetate, the acetate of B. R. 120° C., crotyl acetate, and the unidentified hydrocarbons of B. R. 90°-130° C. by continuously distilling from them the azeotropes formed with the water remaining dissolved or mechanically suspended in the organic liquid layer on stratification in the continuous separator.

LESTER E. SCHNIEPP.

REFERENCES CITED

The following references are of record in the file of this patent:

UNITED STATES PATENTS

| Number | Name | Date |
|---|---|---|
| 2,050,235 | Othmer | Aug. 4, 1936 |
| 2,096,734 | Coutour | Oct. 26, 1937 |
| 2,170,834 | Othmer | Aug. 29, 1939 |
| 2,269,163 | Othmer | Jan. 6, 1942 |
| 2,317,758 | Guinot | Apr. 27, 1943 |

FOREIGN PATENTS

| Number | Country | Date |
|---|---|---|
| 101,321 | Austria | Oct. 26, 1925 |